United States Patent [19]

Leverenz

[11] Patent Number: 4,803,772
[45] Date of Patent: Feb. 14, 1989

[54] SYSTEM FOR MAXIMIZING MACHINE UTILIZATION

[75] Inventor: Steven J. Leverenz, Sun Prairie, Wis.

[73] Assignee: Deere & Company, Moline, Ill.

[21] Appl. No.: 28,370

[22] Filed: Mar. 20, 1987

[51] Int. Cl.[4] ............................................. B23Q 3/156
[52] U.S. Cl. ........................................ 29/568; 72/446; 269/319
[58] Field of Search .................... 29/500; 72/446, 462; 409/219, 220; 269/319, 402

[56] References Cited

U.S. PATENT DOCUMENTS

| | | | |
|---|---|---|---|
| 3,543,392 | 12/1970 | Perry et al. | 29/568 X |
| 3,851,380 | 12/1974 | Kurimoto et al. | 29/568 |
| 4,110,897 | 9/1978 | Hipwell et al. | 29/568 |
| 4,152,978 | 5/1979 | Abe et al. | 72/446 X |
| 4,168,567 | 9/1979 | Leguy et al. | 29/568 |
| 4,354,306 | 10/1982 | Ida et al. | 29/568 |
| 4,369,563 | 1/1983 | Williamson | 29/568 |
| 4,472,783 | 9/1984 | Johnstone et al. | 29/568 X |
| 4,711,016 | 12/1987 | Genschow et al. | 29/568 |

FOREIGN PATENT DOCUMENTS

| | | | |
|---|---|---|---|
| 110815 | 6/1984 | European Pat. Off. | 29/568 |
| 227636 | 9/1985 | Fed. Rep. of Germany | 29/568 |

Primary Examiner—William Briggs

[57] ABSTRACT

A system and method for increasing machine utilization and for minimizing tool changeover time comprising a storage and retrieval system located in near proximity to a press or a machine line for storing a plurality of dies or tooling fixtures, a pair of conveyors, one installed on each end of each machine bed so that a plurality of dies or tooling fixtures can be pre-staged thereon for utilization in machine or transferred thereto for inspection, cleaning and preparation for reuse and subsequent storage in the storage system. With respect to tooling, and the machines themselves, each machine is provided with at least two hydraulic actuated clamps, at least two locators, one having a locator post formed therein. Both the actuator clamps and the locators are positioned on a solid bed. Tooling modification includes the installation of sub-plates having a V-shaped slot which when used in conjunction with the locator post, provides for rapid and accurate positioning of each tooling fixture on the machine. To increase machine utilization further, an electric motor and a mechanical screw mechanism are connected to the bed for rapidly and accurately raising and lowering the machine bed.

7 Claims, 3 Drawing Sheets

SYSTEM FOR MAXIMIZING MACHINE UTILIZATION

BACKGROUND OF THE INVENTION

The present invention relates to a method and a system for maximizing machine utilization time and, more particularly, to a method and system for reducing the tooling changeover time for press and/or machining operations.

In conventional manufacturing operations where one operation produces common parts for another operation, prior practice has been to schedule lengthy machine runs with particular parts being stockpiled for use later in the assembly process. At the end of the run, the machine operator would disassemble the tool from his press or machine, go to a central tool crib, return any reuseable tools/dies and equipment and withdraw new tool or dies, gauges, paperwork and other tools for the next scheduled run. He would then return to his machine to prepare the machine for the next run. Obviously, this was a slow process and if it became necessary to change tooling often, tremendous losses of time would be experienced, especially if a number of machines were scheduled for changeover at the same time or if the new die or tooling required lift truck type transportation to and from the tool storage location or tool crib area.

To further complicate the situation, if the length of machine runs would decrease, requiring more frequent tooling changes, it would be obvious that unacceptable machine utilization time would result therefrom. Such delays could be experienced if machine operations were converted from the conventional concept of long runs to a just-in-time (JIT) concept.

Upon implementation of JIT operations having shorter machine runs and more frequent tooling changeovers, it was immediately apparent that a new approach to tooling changes would be required if the JIT program were to be efficient and machine utilization were to be maximized.

Thus, there is a need for an improved system and method which would provide efficient tooling changeovers; which would maximize machine utilization time and which would allow for maximum flexibility in planning production runs.

SUMMARY OF THE INVENTION

The present invention is a method and a system for increasing the efficiency of press and machining operations in conjunction with the implementation of a just-in-time production program which significantly reduces work-in-process inventory while significantly reducing tool changeover time and significantly increasing machine utilization.

In accordance with the present invention, the system includes a satellite storage system for tooling, fixtures, dies, etc. in the immediate proximity to the point of use. The installation comprises a modification of a Stanley-Vidmar STAK ® Storage and Retrieval System located in near proximity to a press drill line or machine cell, so that machine operators would no longer have to travel to a central tool crib to return and draw tooling for each tool change.

In addition to the modified Stanley-Vidmar STAK ® Storage and Retrieval System, a pair of gravity fed roller conveyors are installed on each end of the machine tool or press so that a plurality of tools, dies or tooling fixtures can be pre-staged thereon. Specifically, one of the conveyors, preferably the one to the operator's left, is utilized to deliver the tooling or die to a selected press or machine. The other conveyor, preferably the one to the operator's right, is utilized to post-storage prior to the used tooling or die being picked up by a crib attendant who operates a mast-fork lift which is a component part of the modified Stanley-Vidmar STAK ® Storage and Retrieval System. The tool attendant separates the perishable from the firm tooling, washes the firm tooling and then replaces the firm tooling in the Stanley-Vidmar STAK ® Storage and Retrieval System utilizing the mast-fork lift.

In operation, the method of the present invention consists of a tool crib attendant selecting a plurality of tooling for a plurality of jobs from the storage and retrieval system according to a production schedule. This same attendant then pre-stages the tooling fixture on each machine's incoming conveyor. Upon the completion of a particular job, an operator places the tooling which had been installed in his machine on the post-staging or return conveyor and installs the pre-staged tooling from the incoming conveyor on his machine. The machine operator then changes his finished part tub and continues immediately with the next production run without leaving his work station to either return or pickup new tooling.

A further aspect of the present invention which aids significantly to the decreased changeover time and increased machine utilization includes the modification of the machine and tooling to provide hydraulic actuated clamps on the machine or press bed; installing sub-plates having a V-shaped slot for quick positioning to each tool or die; attaching locators on each machine bed for use in conjunction with the V-shaped slot and the hydraulic clamp to both accurately and rapidly position the tooling in the machine; installing an air-adjustable counterbalance system for heavy tooling; replacing T-slotted machine beds with a solid bed; redesigning tooling for drilling and tapping multi-heads using a leader pen concept and installing an electric motor and mechanical screw for rapidly and accurately raising the lowering the machine bed.

The primary objective of this invention, therefore, is to provide a method and a system for implementing a method which reduces overall tooling changeover time by at least 20%; which improves production rates; which reduces work-in-process storage, which insures that just-in-time schedules are met; which reduces the physical effort required by an operator to change tooling in a machine; which increases machine availability and which provides flexibility so that unexpected rush jobs can be accommodated without intefering with previously determined schedules.

Other objects and advantages of the invention will be apparent from the following description, accompanying drawings and appended claims.

DESCRIPTION OF A PREFERRED EMBODIMENT

Figure 1:
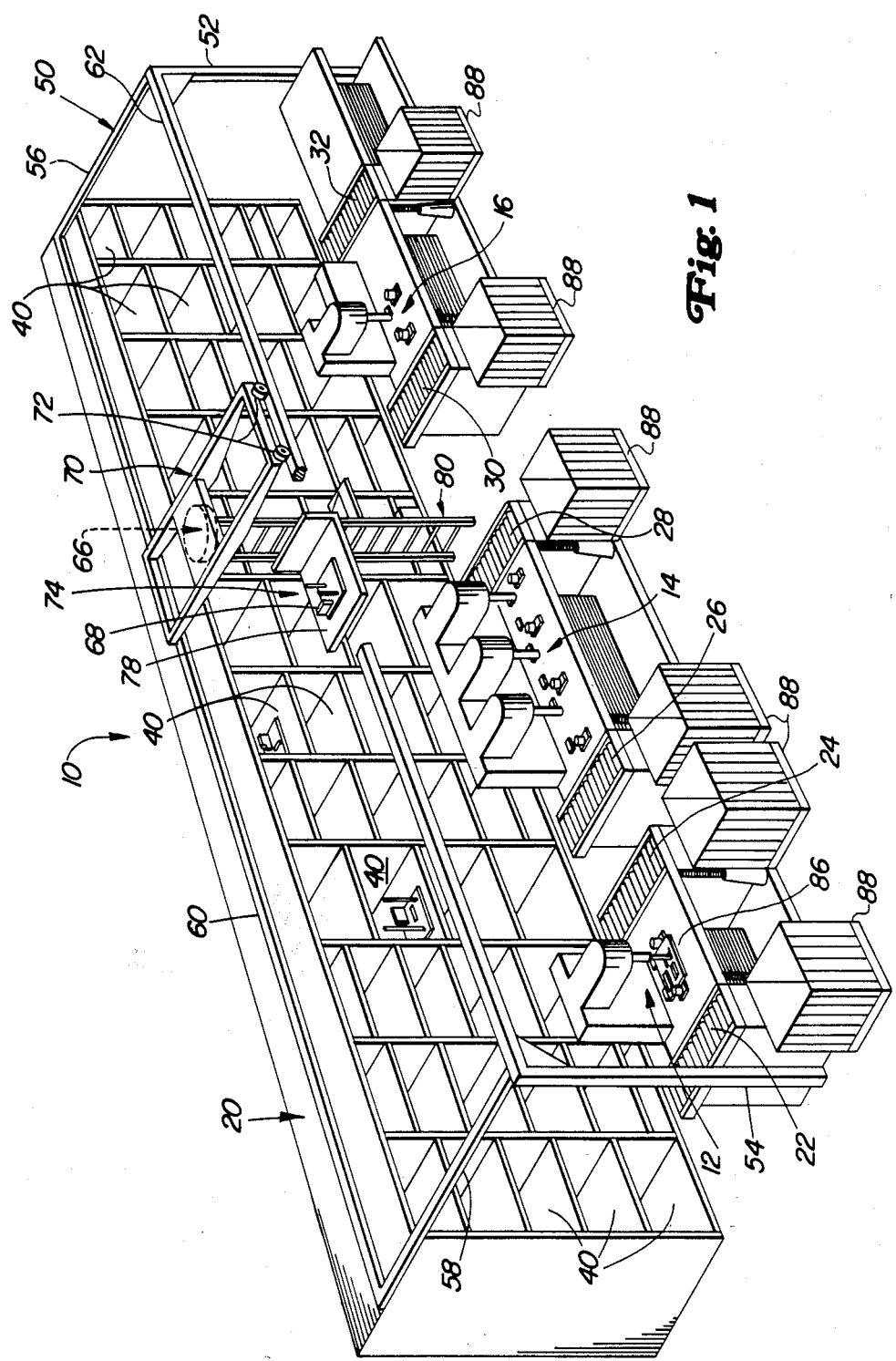
FIG. 1 is a perspective view of a representative drill press operation incorporating the features of the present invention.
Figure 2:
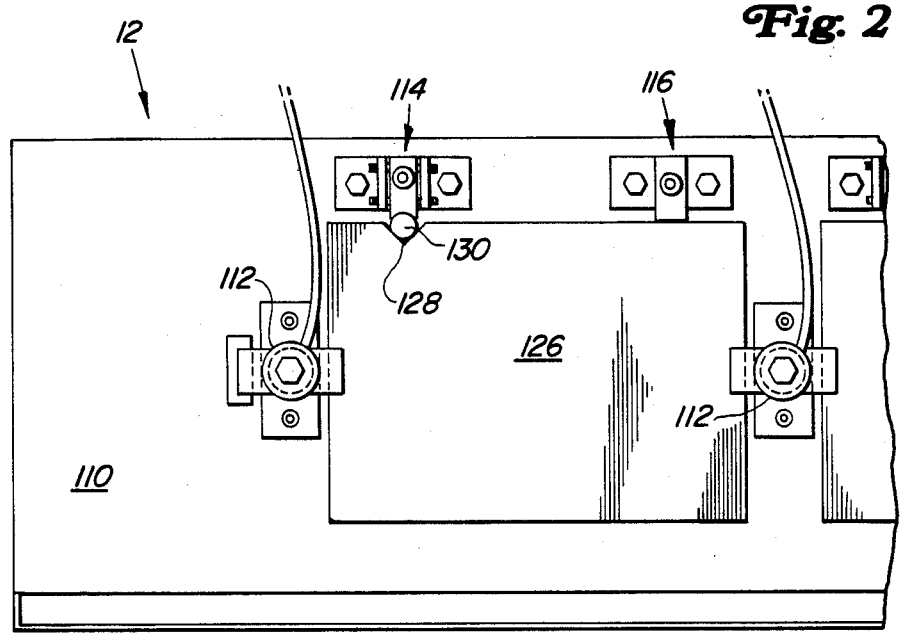
FIG. 2 is a partial plan view of a tool positioned in one of the machines of FIG. 1.
Figure 3:
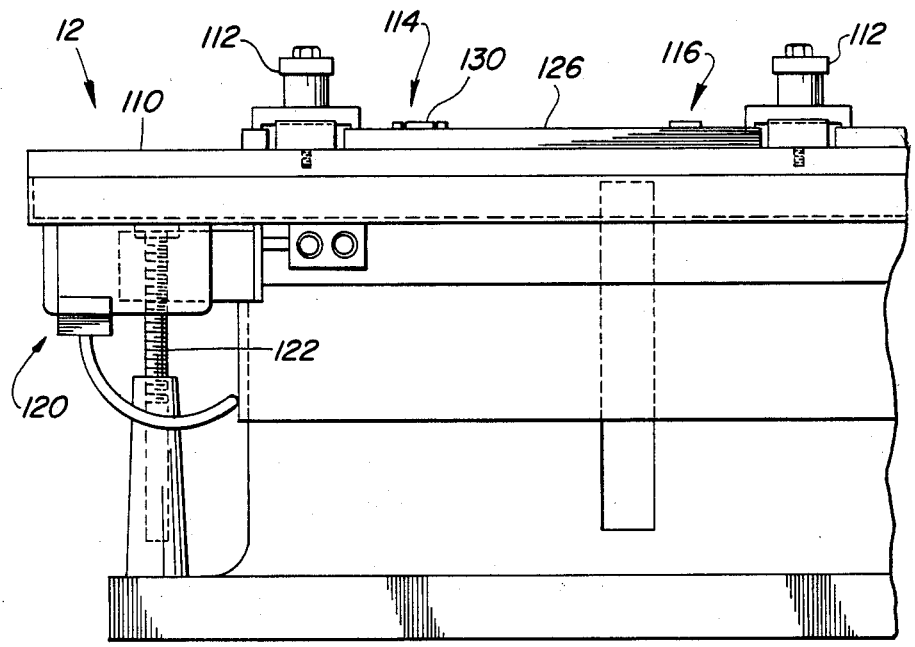
FIG. 3 is a partial side view of one of the machine beds of FIG. 1.

A representative embodiment of the present invention is illustrated by way of example in FIGS. 1—3. With specific reference to FIG. 1, a system 10 for maximizing machine utilization and reducing tool change-over time includes a plurality of drill press machines 12, 14, 16, a storage and retrieval system 20 positioned directly behind and parallel to the drill presses and conveyors 22, 24, 26, 28, 30, 32 located on each side of each drill press 12, 14, 16, respectively.

Three drill presses are shown in FIG. 1 for illustrative purposes only, it being understood that the system and method of the present invention can be utilized with as few as one machine and as many machines as a particular operation might require. It should also be understood that the storage and retrieval system could be positioned behind and perpendicular to a single machine when used with only a single machine. The illustrated machines are relatively small drill presses, however, it should also be understood that the system and method of the present invention is equally applicable to large drill presses as well as large and small stamping machines or any machine tool which would required frequent tooling changes.

The storage and retrieval system 20 comprises a plurality of storage locations 40. The storage system 20 illustrated is a Stanley-Vidmar STAK® Storage and Retrieval System commercially available from The Stanley-Vidmar Company and utilizes their patented universal pallet. Each of the specific storage locations can be adjusted to increase or decrease the vertical distance between shelves. The particular details of the universal pallet are disclosed in U.S. Pat. No. 4,344,368 which is hereby incorporated by reference.

Interconnecting the press line with the storage system is a frame 50 preferably consisting of two vertical members 52, 54, two relatively shorter horizontal members 56, 58 connecting the two vertical members 52, 54 with the storage location 40 and two relatively longer horizontal members 60, 62 one connecting the two vertical members 52, 54 and running preferably along the back of the press line and the other 60 being located preferably along the top and in the middle of the storage locations 40 the exact location of member 60 is dependent upon the desired working space between the press line and the storage locations 40.

A captive mast-fork lift 66 for removing from and returning tooling 68 to one of the specific individual storage locations 40 and for moving them into proximity of a selected machine includes a frame 70 having each end thereof supported by rollers 72 on the two relatively longer horizontal members 60, 62. A fork member 74 for transporting tooling 68 from the storage location 40 to the machines 12, 14, 16 and from the machines to the storage location 40 includes a platform 78 which can be adjusted both vertically and rotated 180° about a vertical frame 80.

A pair of conveyors 22, 24, 26, 28, 30, 32, preferably gravity feed roller conveyors, are positioned perpendicular to the machine line at each end of each machine 12, 14, 16. The combination of machine and gravity feed roller conveyors forms a U-shaped complex. One conveyor, 22, 26, 30, preferably the one to an operator's left, is utilized to pre-stage selected tooling 68 in a predetermined order for the scheduled machine runs for a certain period. The other gravity fed roller conveyor 24, 28, 32, preferably located to a machine operator's right, is utilized as a post staging means to initiate the process of returning the utilized tooling 68, once their machine run is completed, back to the storage locations 40 for future utilization in a later machine run.

In operation, a plurality of tooling 68 is removed from the storage system 20 by the mast-fork lift 66 and pre-staged on each incoming conveyors 22, 26, 28 for each machine 12, 14, 16 in a selected order to meet the production schedule. For example, a machine operator installs a first tooling 86 in a machine 12 and then runs the parts required for that particular run. Upon completion of that run, the operator removes the first tool 86 from the machine 12, places it on the outgoing conveyor 24, installs a second pre-staged tool in the machine, obtains the proper raw material and tub 88 for placing the completed part for the new machine run and commences the run with the second tool.

Since each of the conveyors 22, 26, 28 has the capability of storing a plurality of selected tools 68, an attendant may or may not pick-up the tool from the completed run immediately. However, once the attendant returns to the machine 12, he loads the tool 68 on the captive mast-fork lift 66, inspects it, has it washed and, in general, performs any minor tool maintenance, and then returns the tool 68 to its specific storage location 40.

Figure 4:
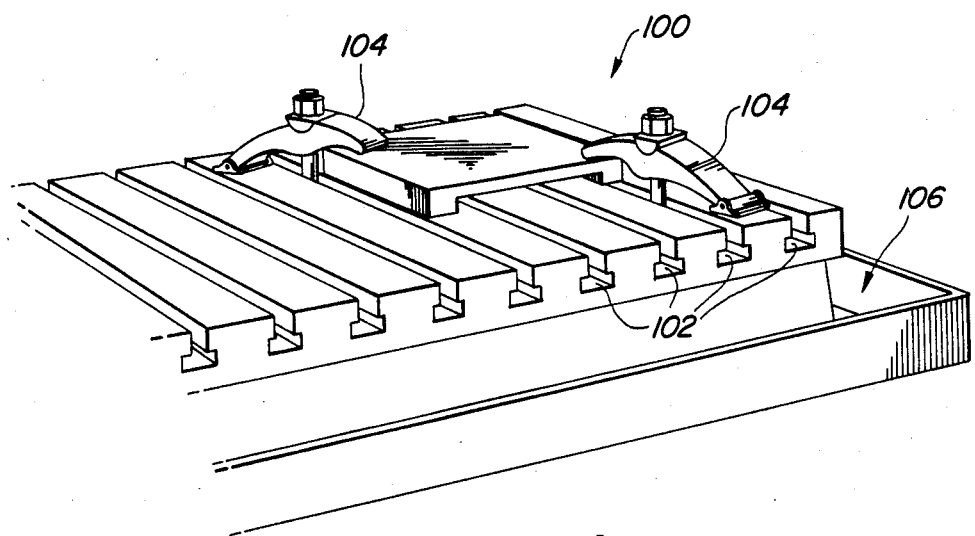
FIG. 4 is a partial perspective view of a prior machine bed.

FIGS. 2-3 illustrate specific features of the system which improves machine utilization. FIG. 4 illustrates a machine table utilized prior to conversion to the machine tables utilized with the present system. The prior table 100 consisted of a plurality of T-slots 102 which were utilized to position clamps 104 for holding a fixture (not shown) in a specific location on the machine. The T-slots 102 also allowed the lubricating fluid or cooling fluid to drain therefrom into a moat-type arrangement 106 around the table 100.

While these manual clamps 104 and T-slots 102 were effective during long machine runs, with the adoption of just-in-time production requiring numerous tooling changes, it became apparent that machine utilization time could be optimized not only by locating the tooling in near proximity to the using machine, but by also streamlining the method for positioning the tooling on the machines and for holding the tooling in position once properly positioned.

As shown in FIGS. 2 and 3, modifications to the existing machine 12 are illustrated. Specifically, these modifications include replacing the old T-slotted machine bed with a solid bed 110, attaching hydraulically actuated clamps 112 to the machine bed 110, attaching locators 114, 116 on the machine bed, installing an electrical motor 120 and mechanical screw 122 for raising and lowering the machine bed 110. Additional modifications were made to the tooling (not shown) by attaching a sub-plate 126 to each tooling fixture. The sub-plate 126 has a V-shaped slot 128 for quick positioning when aligned with the leader post 130 which forms parts of the locator 114 on the machine bed 110.

In operation, as shown in FIG. 2, the hydraulically actuated clamps 112 positioned on the flat machine bed secure a particular tooling sub-plate 126 in position on the bed 110. In conjunction with the hydraulic clamps, a pair of locators 114, 116 attached to the machine bed 110 are utilized to accurately position the sub-plate 126 thereon. One of the locators 114 includes a post 130 perpendicular to the plane of the machine bed 126 for engagement with the V-shaped slot 128 on the tooling sub-plate 126. Then, the air counterbalance device is utilized to balance the spindle return by actuating an air valve (not shown). Additionally, in order to maximize the versatility of each machine, and to minimizing the time required to position the machine bed for each job change, an electric motor 120 and mechanical screw 122 may be installed on each machine for raising and lowering the machine bed 110 in order to change bed position.

With the above mentioned modifications to the machine itself, upon completion of a particular run with a particular tool, an operator could rapidly disengage the tooling from the machine, move it on to the right post-staging conveyor for cleaning, inspection and eventual return of the tooling to the storage system 20, secure the next tool for his next run, position it on the machine table 110, utilizing the V-shaped slot 128 and locators 114, 116, quickly secure the sub-base 116 of the tool to the machine utilizing the hydraulically actuated clamps 112, and adjust the machine table 110 vertically to the exact position required by this particular run, change his material tubs 88 and immediately commence production with minimum downtime for the tooling changeover.

When removing a tool from a machine, an operator first shuts the spindles down, removes the chips from the tooling, releases the clamps 112 and removes the tool including the sub-plate 126 therefrom. The old tool is then placed on the right post-staging conveyor. Next, the operator transfers the new tool to the machine from the pre-staging conveyor and slides it into contact with the locators 114, 116, insuring that the post 130 is properly positioned in the V-slot 128. After the tool sub-plate is properly positioned relative to both locators, the operator actuates the hydraulic clamps such that the sub-plate 126 is securely positioned on the machine bed 110. The machine is now ready for operation.

Thus, it can be seen that the system and the method of utilizing the system maximize machine utilization while simultaneously reducing the machine tooling changeover time, reducing work-in-progress inventory and provides for flexible schedules to meet just-in-time assembly operation.

While the methods herein described and the forms of apparatus for carrying these methods into effect constitute preferred embodiments of this invention, it is to be understood that the invention is not limited to these precise methods and forms of apparatus, and that changes may be made in either without departing from the scope of the invention, which is defined in the appended claims.

What is claimed is:

1. A system for maximizing machine utilization and minimizing tool changeover time, said system comprising:
    a plurality of individual tooling, each having means operatively connected thereto, for rapidly and accurately positioning any one of said individual tooling on said machine;
    at least one machine having a machine bed for selectively operating said plurality of individual, tooling, said machine bed having an upper and a lower surface, said bed having at least two hydraulically actuated clamps and at least two location means operatively positioned on said bed, said positioning means further comprising:
    a sub-plate operatively connected to each of said individual tooling, said sub-plate having a V-slot formed therein for interacting with said location means;
    tooling storage means, located proximate to said machine, for storing each of said plurality of individual tooling in an individual location therein;
    pre-staging means, operatively positioned proximate said machine, for pre-staging at least two of said plurality of individual tooling thereon for utilization by said machine;
    post-staging means, operatively positioned proximate said machine, for post-staging at least one of said tooling after utilization in said machine and prior to said tooling being returned to said storage means; and
    transfer means, operative between said pre-staging means, said post-staging means and said storage means, for transferring any specific one of said plurality of individual tooling from its individual location in said storage means to said prestaging means and for transferring said individual tooling from said post-staging means to said tooling storage means.

2. The system of claim 1 wherein said bed is solid and includes means for raising and lowering said bed, said raising and lowering means being operatively connected to said lower surface of said bed.

3. The system of claim 2 wherein said raising and lowering means comprises a motor and a screw mechanism.

4. The system of claim 3 wherein said motor is electric.

5. The system of claim 1 wherein said prestaging means further comprises:
    a roller conveyor operatively positioned proximate said machine.

6. A system for maximizing machine utilization comprising:
    at least one machine;
    a plurality of individual tooling for utilization in said machine;
    storage means, operatively positioned proximate said machine, for individually storing a plurality of said individual tooling, each in a selected storage location;
    transfer means, operatively positioned between said machine and said storage means, for transferring selected individual tooling from said storage locations to a pre-staging means for utilization in said machine and then for transferring said individual tooling from a post-staging means back to said storage means;
    positioning means, operatively connected to each of said individual tooling for rapidly and accurately positioning said tooling on said machine thereby minimizing the time required to change tooling between production runs on said machine, said positioning means, further comprising:
    at least two hydraulic clamps operatively positioned on the upper surface of said bed;
    at least two locators operatively positioned on said bed; and
    a sub-plate operatively connected to each of said individual tooling, each sub-plate having a V-shaped slot formed therein, said V-shape slot being aligned with one of said locators such that said individual tooling is accurately positioned on said bed.

7. A system for maximizing machine utilization while minimizing tool change time, said system comprising:
 a plurality of individual tooling;
 at least one machine having a bed with upper and lower surfaces for utilizing said plurality of individual tooling in a production run whereby each of said individual tooling may be selected in any order for utilization in said machine;
 a tooling storage system having a plurality of individual storage bins, said storage system being located proximate said machine, each of said individual tooling being stored in one of said individual storage bins;
 pre-staging means, operatively positioned proximate said machine, for pre-staging a plurality of said individual toolings;
 post-staging means, operatively positioned proximate said machine, for post-storing at least one of said plurality of individual tooling after a production run utilizing said individual tooling has been completed;
 transfer means, operatively positioned between said tooling storage system, said pre-staging means and said post-staging means, for transferring said selected individual tooling in a sequence according to said production schedule from said tooling storage system to said pre-staging means and from said post-staging means to said tooling storage system; and
 positioning means, operatively connected to each of said individual tooling for rapidly and accurately positioning said tooling on said machine thereby minimizing the time required to change tooling between production runs on said machine, said positioning means, further comprising:
 at least two hydraulic clamps operatively positioned on the upper surface of said bed;
 at least two locators operatively positioned on said bed; and
 a sub-plate operatively connected to each of said individual tooling, each sub-plate having a V-shaped slot formed therein, said V-shape slot being aligned with one of said locators such that said individual tooling is accurately positioned on said bed.

* * * * *